(12) United States Patent
Hoegl et al.

(10) Patent No.: US 9,964,074 B2
(45) Date of Patent: May 8, 2018

(54) APPARATUS FOR FURNISHING WATER AND METHOD AND APPARATUS FOR CONTROLLING AN ELECTRIC PUMP FOR FURNISHING WATER FOR INJECTION INTO A COMBUSTION CHAMBER OF AN ENGINE

(71) Applicant: Robert Bosch GmbH, Stuttgart (DE)

(72) Inventors: Johannes Hoegl, Stuttgart (DE); Ingmar Burak, Stuttgart (DE); Julian Hagenloch, Talheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 38 days.

(21) Appl. No.: 15/291,233

(22) Filed: Oct. 12, 2016

(65) Prior Publication Data

US 2017/0107950 A1    Apr. 20, 2017

(51) Int. Cl.
*F02M 25/022* (2006.01)
*F02B 47/02* (2006.01)
*F02M 25/03* (2006.01)

(52) U.S. Cl.
CPC ......... *F02M 25/0227* (2013.01); *F02B 47/02* (2013.01); *F02M 25/0221* (2013.01); *F02M 25/0228* (2013.01); *F02M 25/03* (2013.01); *Y02T 10/121* (2013.01)

(58) Field of Classification Search
CPC ............. F02M 25/0227; F02M 25/022; F02M 25/0221; F02M 25/0222; F02M 25/0228; F02M 25/025; F02M 25/028; F02M 25/03; F02B 47/02
See application file for complete search history.

(56) References Cited

U.S. PATENT DOCUMENTS

2011/0146617 A1* 6/2011 Kamio ............... F02M 25/0228
123/25 E

FOREIGN PATENT DOCUMENTS

DE       3928611 A1     3/1991

* cited by examiner

*Primary Examiner* — Jacob Amick
(74) *Attorney, Agent, or Firm* — Norton Rose Fulbright US LLP; Gerard Messina

(57) ABSTRACT

A method and an apparatus for controlling an electric pump for furnishing water for injection into a combustion chamber of an engine are provided. The electric pump is connected to an inflow of a main water tank and has a high-pressure output at which the electric pump makes available water at a pressure elevated with respect to a pressure in the main water tank. The high-pressure output of the electric pump is connected to a return line that opens into a driving jet connector of a suction jet pump, a suction jet connector of the suction jet pump being connected to a further water tank, and a high-pressure output of the suction jet pump being connected to the main water tank.

14 Claims, 2 Drawing Sheets

APPARATUS FOR FURNISHING WATER AND METHOD AND APPARATUS FOR CONTROLLING AN ELECTRIC PUMP FOR FURNISHING WATER FOR INJECTION INTO A COMBUSTION CHAMBER OF AN ENGINE

CROSS REFERENCE

The present application claims the benefit under 35 U.S.C. § 119 of German Patent Application No. DE 102015220326.3 filed on Oct. 19, 2015, which is expressly incorporated herein by reference in its entirety.

BACKGROUND INFORMATION

The present invention relates to an apparatus for furnishing water, a method for controlling a electric pump, and an apparatus for controlling an electric pump, each for the purpose of injecting water into a combustion chamber of an engine. The injection of water into a combustion chamber of an engine is described in German Patent No. DE 3928611 A1.

SUMMARY

An apparatus according to the present invention for furnishing water, a method according to the present invention for controlling an electric pump for furnishing water, and an apparatus according to the present invention for controlling an electric pump for furnishing water, for the injection of water into a combustion chamber of an engine, may have the advantage that refilling of a main water tank in which the water required for injection is contained is accomplished respectively by way of a particularly simple apparatus and control application system. No further electrically actuated elements, besides the electric pump that is provided in any case, are required for this refilling. Pumping operation by way of a suction jet pump can be implemented in particularly simple fashion by activating a pumping mode of the electric pump. It is particularly advantageous in this context if aside from the activation of pumping operation, this suction jet pump has no further actively controlled elements, so that further wiring or control application mechanisms are omitted. Particularly simple refilling of the main water tank with water that is contained in a further tank can thus be accomplished.

Further advantages and improvements result from the features described herein. For use in multi-cylinder engines the electric pump can be connected, either directly or via a further high-pressure pump, to a water rail into which water is introduced at a predefined pressure. A water rail of this kind is then suitable for supplying multiple water injectors. Injection can be accomplished particularly easily into an intake duct of the internal combustion engine. Injection can also be accomplished directly into the combustion chamber; this offers the advantage that particularly hot locations in the combustion chamber are filled directly.

A further possibility is to generate an emulsion of fuel and water which is then injected into the internal combustion engine. With this method, only one injection valve per cylinder can then be utilized. In order to correct erroneous application of control to the electric pump, in particular an entirely mechanical pressure limiting valve can be provided, in particular in the return line. The electric pump is in particular embodied controllably, so that it can be switched on and off as necessary. Unnecessary energy consumption for operating the pump, and obtrusive noise due to operation of the pump, can thereby be avoided.

The pump is switched on, i.e., pumping operation is activated, in particular when the fill level in the main tank is low. Furthermore, pumping operation can also be activated depending on a fill level of the further water tank. This ensures that pumping operation only ever occurs when water can be pumped from the further water tank into the main water tank, i.e., when water is available in the further tank. Because of the dependence of the activation of pumping operation on operating data of the vehicle, it is furthermore possible to shift such pumping operation to phases in which larger quantities of water are available in the further tank, or to phases in which the noise of pumping operation is not perceptible as a result of operating conditions of the engine.

BRIEF DESCRIPTION OF THE DRAWINGS

Exemplifying embodiments of the present invention are depicted in the figures and explained in further detail below.

DETAILED DESCRIPTION OF EXAMPLE EMBODIMENTS

Figure 1:
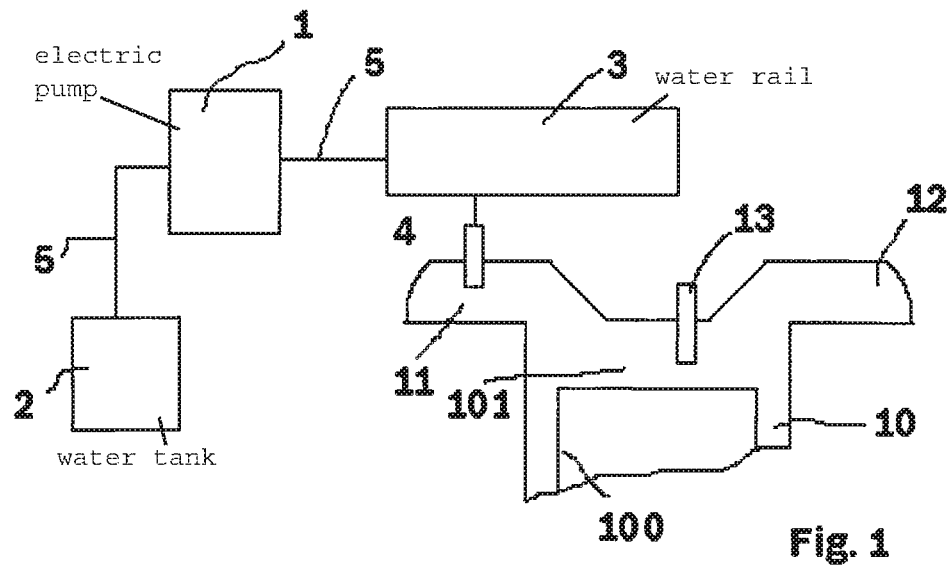
FIGS. 1 to 3 show various embodiments of a water injection system in an engine.

FIG. 1 schematically shows an engine, i.e., a combustion engine, having a cylinder 10. In cylinder 10, a combustion chamber 101 is defined by a piston 100. Air is conveyed through an intake duct 11, and fuel through a fuel injector 13, to cylinder 10 and to combustion chamber 101 for combustion. The exhaust gases occurring in that context are discharged from cylinder 10 through exhaust duct 12. The engine referred to here is a usual gasoline or diesel engine that is depicted merely schematically in FIG. 1. In particular, further control elements such as air inlet valves and exhaust gas outlet valves, means for influencing the air flow through intake duct 11 (for example, a throttle valve), a spark plug or a glow plug, and other elements of usual gasoline engines and diesel engines, are not depicted, since they are not important for an understanding of the invention. A system for water injection into intake duct 11 is also shown in FIG. 1. The water injection system is made up of a water tank 2 that is connected via a connecting line 5 to an electric pump 1. Through connecting line 5, water can flow out of tank 2 to electric pump 1 or can be drawn out of the tank by electric pump 1. That side of electric pump 1 which is connected via connecting line 5 to water tank 2 will hereinafter be called an "inflow." Electric pump 1 furthermore has a high-pressure output that is connected via connecting line 5 to a water rail 3. Water rail 3 is a pressure reservoir that can be filled with water by the electric pump, and is impinged upon by a pressure. The pressure is relatively low especially in the context of injection into the intake duct, so that water rail 3 can also be embodied as a simple hose or as a hose distributor. Water rail 3 is then connected via a further connecting line 5 to a water injector 4 that opens into intake duct 11. The water in tank 2 is thus delivered via the inflow of electric pump 1 and is made available at elevated pressure at the high-pressure output of pump 1. This water is then temporarily stored in water rail 3 until it is injected into intake duct 11 through a corresponding opening of water injector 4.

A plurality of water injectors 4 that supply water to a plurality of cylinders 10 can also be connected to water rail 3. Especially in the context of multi-cylinder engines that are usual nowadays in motor vehicles, this is a configuration with which each cylinder can be individually supplied with a quantity of water matched to it.

The injection of water into intake duct 11 generates, together with the fuel injected through fuel injector 13, a mixture of air, fuel, and water in combustion chamber 101 of cylinder 10. Combustion of the air-fuel mixture in the combustion chamber of cylinder 10 then occurs as a result of a corresponding ignition event, either by way of a spark plug or thanks to a self-ignition process in a diesel engine. The water contained in this air-fuel mixture results in effective cooling of combustion chamber 101 in cylinder 10, with the result that the combustion temperature is reduced and, in the context of use in a gasoline engine, knock susceptibility is decreased. This makes possible an optimized ignition time, which has a positive effect on the efficiency and consumption of the gasoline engine. The production of harmful exhaust gases in gasoline and diesel engines can also be reduced. The introduction of water into a combustion chamber is therefore an action with which the quality of the combustion in the combustion chamber of a cylinder 10 can be positively influenced. Both the quality of the exhaust gas and the thermal stress on cylinder 10, power output, fuel consumption can be positively influenced with this action.

Figure 2:
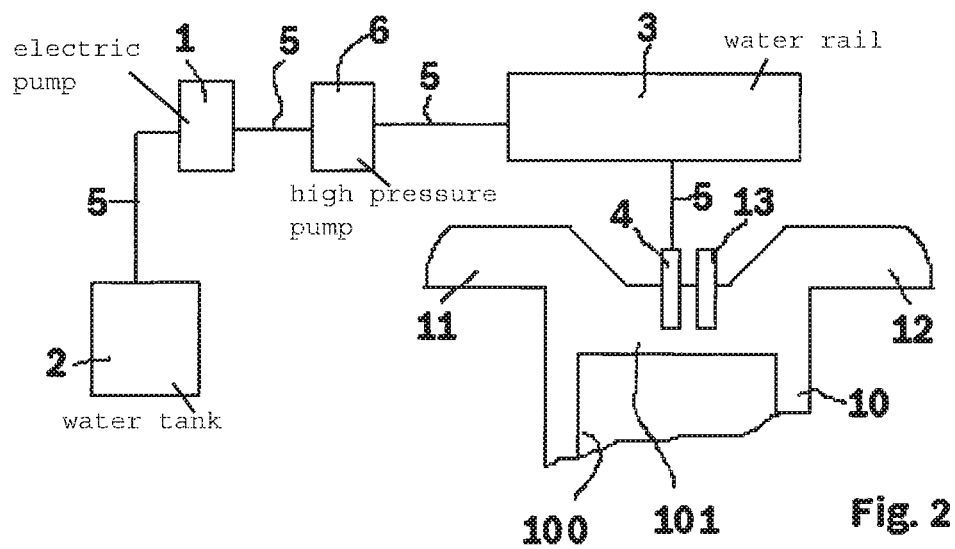

FIG. 2 likewise shows an engine having a system for water injection into the combustion chamber of a cylinder 10. The reference characters 10, 11, 12, 13, 1, 2, 3, 4, 5, 100, 101 again designate the same objects as in FIG. 1. Unlike in FIG. 1, however, water injector 4 is disposed so that it opens not into intake duct 11 but rather directly into combustion chamber 101 of cylinder 10. Injecting water directly into the combustion chamber of cylinder 10 requires appreciably higher pressures than injection into the intake duct. A water pressure of a few bar is sufficient for injecting water into intake duct 11. Because injection into the combustion chamber of cylinder 10 can occur when the air intake valve in the direction of intake duct 11 is already closed and the cylinder is in a compression phase, an appreciably higher pressure of up to approximately 200 bar is necessary for injecting water into a combustion chamber. Water must therefore be stored in water rail 3 at an appreciably higher pressure in order to enable injection directly into the combustion chamber of cylinder 10. A high-pressure pump 6 is arranged for this purpose after electric pump 1. The inflow of high-pressure pump 6 is connected via a connecting line 5 to the high-pressure output of electric pump 1. The high-pressure output of high-pressure pump 6 is connected via a connecting line 5 to water rail 3. The result is to create a configuration in which a pressure is generated which is sufficiently high to allow injection of water directly into the combustion chamber of the engine.

Figure 3:
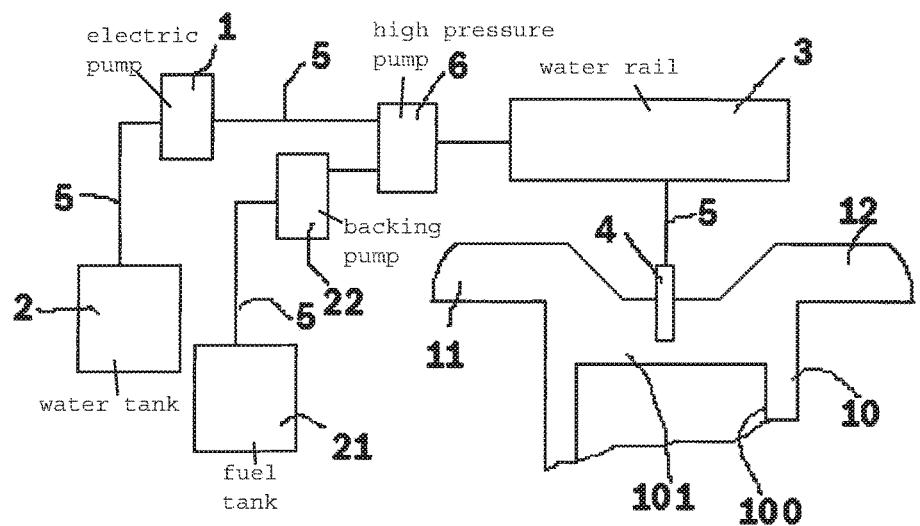

FIG. 3 shows a further form of an engine having a water injection system. The reference characters 1, 2, 3, 4, 5, 10, 11, 12, 13, 100, 101 again designate the same objects as in FIG. 1. FIG. 3 furthermore shows the fuel supply system, having a fuel tank 21 that is connected via a connecting line 5 to a backing pump 22. Backing pump 22 is connected via a connecting line 5 to a high-pressure pump 6. High-pressure pump 6 is then connected via a connecting line 5 to rail 3. High-pressure pump 6 here has two inflow connectors, the one inflow connector being connected to electric pump 1 by which water is pumped, and the other inflow of high-pressure pump 6 being connected to fuel backing pump 22. High-pressure pump 6 pumps both media, and makes available at its high-pressure outlet an emulsion of the two liquids at a pressure suitable for injection directly into the combustion chamber. Because fuel and water as a rule do not mix, an emulsifier is added to the water so that the blending of water and fuel results in formation of an emulsion of fuel and water. This emulsion is then stored in rail 3 at a correspondingly high pressure and is injected through injector 4 directly into combustion chamber 101 of cylinder 10. Fuel and water are thus injected simultaneously through injector 4 into combustion chamber 101.

Further variations of internal combustion engines having a water injection system are also possible, and result from modifications of the engines shown in FIGS. 1 to 3. For example, fuel can also be injected into the intake duct, with water injected likewise into the intake duct or else directly into the cylinder. Double fuel injection, both into the intake duct and into the cylinder, can also be used as a further variant. In multi-cylinder engines only individual cylinders, in particular thermally highly stressed cylinders, can be designated for water injection.

Figure 4:
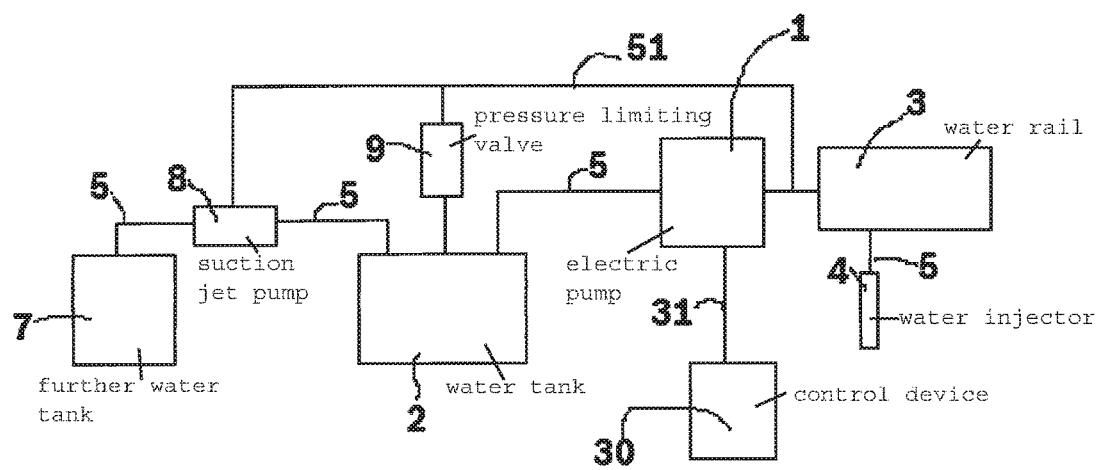
FIG. 4 shows the apparatus according to the present invention for furnishing water for injection into a combustion chamber.

FIG. 4 depicts a system according to the present invention for water injection into a combustion chamber 101 of an engine. For reasons of simplification, the engine having cylinder 10, intake duct 11, and exhaust duct 12 is not depicted. The reference characters 1, 2, 3, and 4 again designate the same objects having the same functions as in FIGS. 1 to 3. Unlike in the previous depictions, however, the apparatus according to the present invention for furnishing water for injection into a combustion chamber of an engine has not only a water tank 2 but also a further water tank 7. For clear differentiation, water tank 2 is referred to hereinafter as a "main water tank" and water tank 7 as a "further water tank." FIG. 4 shows a water injection system that has only an electric pump 1 and no high-pressure pump 6. What is involved here is therefore a valve for water injection into intake duct 11. If the system is correspondingly conceived for direct injection of water into combustion chamber 101, it is then correspondingly necessary also to provide, after electric pump 1, a high-pressure pump 6 that is then in turn connected to water rail 3.

In FIG. 4 a return line 51 is connected to connecting line 5 between water rail 3 and the high-pressure output of electric pump 1. Return line 51 then opens into a suction jet pump 8, specifically at a drive jet connector of suction jet pump 8. Suction jet pump 8 is furthermore connected at an intake connector, via a line 5, to further water tank 7. A high-pressure output of suction jet pump 8 is connected via a line 5 to main water tank 2. This suction jet pump 8 operates as follows: When water is pumped through suction jet connector 8, a flow in the direction of main water tank 2 is produced in the interior of suction jet pump 8. The flow is compressed by a constriction, i.e. a Venturi nozzle, in such a way as to form a suction jet that, as a result of friction, entrains along with it air molecules and water molecules from tank 7 and also conveys them into main water tank 2. A pumping effect from further water tank 7 to main water tank 2 is thus generated by way of the stream of water directed via return line 51. When a sufficient flow of water is directed through return line 51 via suction jet pump 8, suction jet pump 8 therefore causes water to be pumped out of further tank 7 into main water tank 2.

One advantage of a suction jet pump of this kind is based on the fact that a suction jet pump of this kind has no movable or actuated elements of any kind. The pumping effect of the suction jet pump is produced simply by the flow of water through return line 51 via suction jet pump 8, toward main water tank 2. Suction jet pumps of this kind thus represent a particularly simple element with which water can be pumped out of a further water tank 7 into main water tank 2.

Electric pump 1 is controlled by a corresponding control device 3 by way of corresponding signals to an electrical control line 31, i.e. electric pump 1 is arbitrarily switched on or switched off by way of corresponding signals of control device 30. Different operating modes of the engine determine when electric pump 1 is activated. A first, normal operating mode of electric pump 1 is necessary when the engine is to be operated with water injection. In this normal mode, electric pump 1 is thus switched on and pumps water out of main water tank into water rail 3 at a correspondingly elevated pressure. Because a corresponding flow of water flows in this mode through return line 51 via suction jet pump 8, water is also pumped out of further tank 7 into main water tank 2. The quantity of water withdrawn from main water tank 2 is thus replaced at least in part by an inflow of water from further water tank 7 into main tank 2. The pump output of suction jet pump 8 is typically designed so that only a portion of the quantity of water withdrawn from main water tank 2 by the injection process is replaced, i.e. the delivery output of suction jet pump 8 is typically designed so that the average quantity withdrawn from main water tank 2 is only partly replaced.

A further operating state of the water injection system can be provided when the combustion engine is not being operated with water injection. When no water is being injected into combustion chamber 101, no water is also being conveyed by electric pump 1 into water rail 3. When electric pump 1 is activated in this operating state, water then flows through return line 51 and through suction jet pump 8, thus generating a pumping effect from further water tank 7 to main tank 2. This pumping mode thus causes only pumping of water out of further water tank 7 to main water tank 2.

Because there is an alternation, during operation of an engine, of phases in which water injection is useful with phases in which water injection is not useful, the operating phases in which no water injection occurs can selectably be used for a shutoff of electric pump 1 or for pumping-only operation. Advantageously, electric pump 1 is thus operated not continuously but instead only when operation of electric pump 1 is advantageous, either because water is being injected into the engine or because pumping operation of water from further tank 7 into main tank 2 is intended to occur. The energy expenditure for the operation of the electric pump can thus be reduced by a corresponding application of control to electric pump 1. In addition, such operation of an electric pump 1 or of a suction jet pump 8 is also associated with a certain noise emission. During operation with water injection, such additional noise cannot be avoided because it is then necessary to convey water out of water tank 2 to water rail 3. With regard to pumping-only operation, however, it is possible to use operating phases of the engine or of the motor vehicle in which loud noise is being generated in any case by the engine, so that the additional noise resulting from the operation of electric pump 1 or of suction jet pump 8 cannot be perceived by a user of a motor vehicle in which the engine is installed. The noise emission of the overall system can thereby be minimized.

Further tank 2 is installed, in a vehicle in which the engine is installed, in such a way that water is directed to it from various sources. One source of water in a motor vehicle is, for example, the operation of a climate control system in which condensed water occurs at an evaporator. A further possibility for obtaining water in a motor vehicle is to capture rainwater. A further possibility for obtaining water is that water that has been vaporized in the combustion chamber is condensed again out of an exhaust gas of the engine in an exhaust system of the vehicle, and is then correspondingly directed to further water tank 7. Thanks to the evaluation of corresponding sensor signals using a corresponding control device of the vehicle, for example including control device 30 shown here, it is possible to detect whether the vehicle is currently in circumstances in which water is being added to further tank 7. In the context of a climate control system, for example, the temperature, air pressure, and relative humidity, and the quantity of water precipitating as a result in the condenser of the climate control system, can be calculated. By evaluating the signal at the windshield wipers it is possible to detect that the vehicle is located in a rainstorm and that rainwater is thus being delivered to tank 7. Based on a relative humidity of the air aspirated through intake duct 11, and based on the quantity of water injected into combustion chamber 101 and corresponding engine operating data, it is possible to calculate whether condensation of water is occurring in the exhaust system of the vehicle. It is also thereby possible to ascertain whether a corresponding quantity of water is contained in further water tank 7.

Control is applied to the electric pump depending on the fill level of further water tank 7 and of main water tank 2, and on further conditions of the engine. For example, if the level in main water tank 2 is low, the noise occurring in the context of control application to electric pump 1 is given less weight than if water tank 2 had a fill level that still enabled a relatively long operating time without refilling. Operation of electric pump 1 is likewise useless if there is no expectation, based on the operating data of the motor vehicle, that any water at all is present in further water tank 7. Alternatively, provision can also be made that pumping operation is activated whenever water tank 2 is at risk of becoming empty. A plurality of operating strategies are conceivable for dealing with the various requirements such as a sufficient fill level in main water tank 2, low energy consumption by electric pump 1, and low noise generation by pump 1.

FIG. 4 also shows a pressure limiting valve 9 that is connected to return line 51 and to water tank 2. If excessive water pressure in rail 3 occurs due to incorrect operation of electric pump 1 or in the event of clogging of the suction jet pump, a connection between return line 51 and main water tank 2 can then be created through pressure limiting valve 9. Excess pressure in water rail 3 can thereby be dissipated by opening pressure limiting valve 9. Systems not having such a pressure limiting valve are also possible. Pressure limiting valve 9 is of purely mechanical configuration and opens at a specific pressure.

Filters for eliminating particles are not depicted in FIGS. 1 to 4 but are usually utilized for all liquids. A filter is usually disposed in front of each pump or valve in order to protect the pumps or the valve from particles in the water. Because the particle filters are not necessary for an understanding of the invention, they have not been depicted in FIGS. 1 to 4.

Fill level sensors in the tanks also have not been shown in FIGS. 1 to 4. The fill level of a tank can be determined either by way of a status sensor, usually a float or the like, or by monitoring the inflow and outflow of liquids into and out of the tank. The selection of such a fill sensor, or the replacement of such a status sensor with an estimated inflow and outflow of water, is usually governed by cost considerations, and is therefore also not significant for the functionality of the present invention. From a cost standpoint, it is probably reasonable here to provide a status sensor for main water tank 2, whereas the fill level of further water tank 7 is usually ascertained via an observation of operating data of the vehicle, and an estimate based thereon.

What is claimed is:

1. An apparatus for furnishing water for injection into a combustion chamber of an engine, comprising:
    an electric pump that is connected by an inflow to a main water tank, and having a high-pressure output at which the electric pump makes available water at a pressure elevated with respect to a pressure in the main water tank;
    wherein the high-pressure output of the electric pump is connected to a return line that opens into a driving jet connector of a suction jet pump, an intake connector of the suction jet pump being connected to a further water tank, and a high-pressure output of the suction jet pump being connected to the main water tank.

2. The apparatus as recited in claim 1, wherein the high-pressure output of the electric pump is connected to a water rail.

3. The apparatus as recited in claim 2, wherein the high-pressure output of the electric pump is connected to an inflow of a high-pressure pump; and a high-pressure output of the high-pressure pump is connected to the water rail.

4. The apparatus as recited in claim 1, wherein the at least one water injector is connected to the water rail.

5. The apparatus as recited in claim 1, wherein the apparatus is embodied for injection of water into an intake duct of the engine.

6. The apparatus as recited in claim 1, wherein the apparatus is embodied for injection of water directly into a combustion chamber of the engine.

7. The apparatus as recited in claim 1, wherein the apparatus has an element for forming an emulsion of water and fuel, and the emulsion thus formed is for injection into the engine.

8. The apparatus as recited in claim 1, wherein the return line is connected to a pressure regulating valve, the pressure regulating valve being connected to the main water tank.

9. The apparatus as recited in claim 1, wherein the electric pump is embodied controllably by a control device.

10. A method for controlling an electric pump for furnishing water for injection into a combustion chamber of an engine, the electric pump being connected to an inflow of a main water tank and having a high-pressure output at which the electric pump makes available water at a pressure elevated with respect to a pressure in the main water tank, wherein the high-pressure output of the electric pump is connected to a return line that opens into a driving jet connector of a suction jet pump, a suction jet connector of the suction jet pump being connected to a further water tank, and a high-pressure output of the suction jet pump being connected to the main water tank, the method comprising:
    switching on the electric pump when water is being injected into the combustion chamber; and
    switching on the pump when no water is being injected into the combustion chamber and, in a pumping operation mode, water is to be pumped from the further water tank into the main water tank.

11. The method as recited in claim 10, wherein pumping operation is activated depending on a fill level of the main tank.

12. The method as recited in claim 10, wherein pumping operation is activated depending on a fill level of the further water tank.

13. The method as recited in claim 12, wherein the fill level of the further water tank is ascertained on the basis of operating data of a vehicle in which the further water tank is installed, wherein at least one of: data of a climate control system of the vehicle, environmental conditions of the vehicle, weather data, and operating data of the engine of the vehicle, being used as operating data of the vehicle.

14. An apparatus for controlling an electric pump for furnishing water for injection into a combustion chamber of an engine, the electric pump being connected to an inflow of a main water tank and having a high-pressure output at which the electric pump makes available water at a pressure elevated with respect to a pressure in the main water tank, wherein the high-pressure output of the electric pump is connected to a return line that opens into a driving jet connector of a suction jet pump, a suction jet connector of the suction jet pump being connected to a further water tank, and a high-pressure output of the suction jet pump being connected to the main water tank, the apparatus comprising:
    a control to switch on the electric pump when water is being injected into the combustion chamber, and to switch on the pump when no water is being injected into the combustion chamber and, in a pumping operation mode, water is to be pumped from the further water tank into the main water tank.

* * * * *